United States Patent [19]

Parrish

[11] Patent Number: 5,042,114
[45] Date of Patent: Aug. 27, 1991

[54] ADJUSTABLE CLAMP WITH HANDLE

[76] Inventor: Charles E. Parrish, P.O. Box 1930, Smithfield, N.C. 27577

[21] Appl. No.: 638,447

[22] Filed: Jan. 4, 1991

[51] Int. Cl.$^5$ .......................... B65D 63/00; F16L 3/12
[52] U.S. Cl. ................................ 24/16 PB; 24/17 AP; 248/74.3
[58] Field of Search ............ 24/16 PB, 17 AP, 30.5 P; 248/74.3, 60; 294/153, 156; 292/321, 322

[56] References Cited

U.S. PATENT DOCUMENTS

| | | |
|---|---|---|
| 2,345,279 | 3/1944 | Morehouse . |
| 2,426,708 | 9/1947 | Robertson et al. . |
| 3,009,220 | 11/1961 | Fein . |
| 3,022,557 | 2/1962 | Logan . |
| 3,054,585 | 7/1960 | Roberts et al. . |
| 3,149,808 | 9/1964 | Weckesser .......................... 248/74.3 |
| 3,471,109 | 10/1969 | Meyer . |
| 3,584,525 | 6/1971 | Caveney ............................ 24/16 PB |
| 4,128,220 | 12/1978 | McNeel ................................. 248/60 |
| 4,191,334 | 3/1980 | Bulanda et al. ........................ 24/16 |
| 4,272,047 | 6/1981 | Botka ..................................... 248/74 |
| 4,458,385 | 7/1984 | Espinoza ................................ 24/16 |
| 4,501,354 | 2/1985 | Hoffman ............................ 24/16 PB |
| 4,696,505 | 9/1987 | Shadoan ............................. 294/153 |
| 4,728,064 | 3/1988 | Caveney ............................ 248/74.3 |
| 4,768,741 | 9/1988 | Logsdon ............................ 248/74.3 |
| 4,832,393 | 5/1989 | Pitchford ............................ 294/156 |

Primary Examiner—Victor N. Sakran
Attorney, Agent, or Firm—Richard E. Jenkins

[57] ABSTRACT

An adjustable clamp for holding and/or carrying selected articles comprising an elongate handle member defining a first channel therethrough extending generally in the lengthwise direction thereof and a second channel which perpendicularly intersects the first channel. A flexible strap having an aperture at the first end and a plurality of ridges along a portion of the length of the second end thereof is slidably inserted second end first through the second channel and bent back upon itself and slidably inserted through the first channel of the handle member with the ridges thereof facing the top of the handle member and then inserted through the aperture in the first end of the flexible strap positioned in the handle member first channel. The aperture of the first strap end includes ridge engagement means opposing the ridges of the flexible strap second end extending therethrough, and lock means are provided for releasably urging the ridge engagement means of the aperture of the flexible strap downwardly against at least one of the ridges of the first end of the flexible strap so that the locking mechanism is independent of tension forces applied to the flexible strap by articles held thereby.

12 Claims, 3 Drawing Sheets

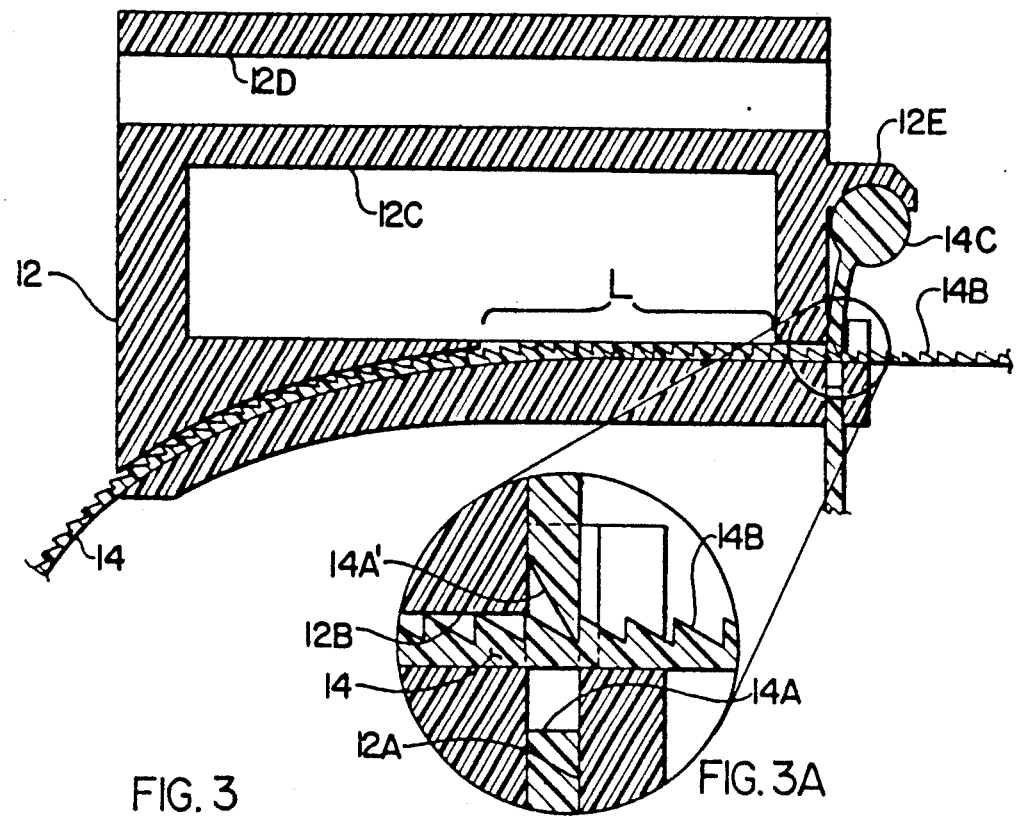
FIG. 3
FIG. 3A
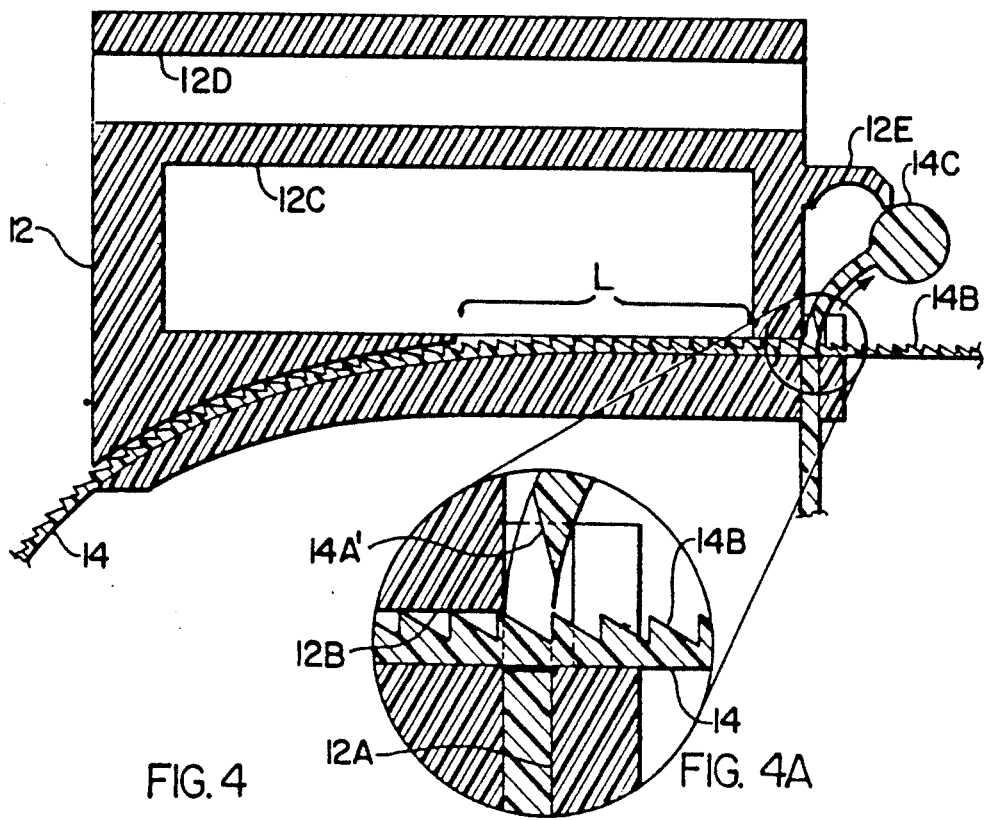
FIG. 4
FIG. 4A

ADJUSTABLE CLAMP WITH HANDLE

DESCRIPTION

1. Technical Field

The present invention relates to flexible clamps and more particularly to a flexible strap for engaging and holding products including wires, cables, water hose and other articles.

2. Related Art

The field of related art is voluminous with flexible clamps which can be wrapped around articles to be engaged to facilitate holding or carrying same. Representative patents include U.S. Pat. No. 2,426,708 to Robertson et al. which discloses an adjustable wire or conduit clip for supporting wires or conduits in aircraft, surface craft and the like. The patent discloses a clip comprising a body portion having a flexible strap attached at one end thereto. The body portion also includes a clamp so that when the strap is passed around a load and looped back upon itself, the clamp may releasably engage the free end of the strap. The flexible strap is formed of a strong fabric coated on one side with rubber or from any other flexible material possessing adequate strength to function in accordance with the invention.

More recently, U.S. Pat. No. 3,471,109 to Meyer discloses an adjustable clamp for wires, cables, conduits and the like which is suitably formed from resilient polypropylene and comprises a body portion with a slot therein for securing the clamp to a support surface. A strap extends from the body portion and defines ribs across the surface thereof so that the strap may be looped around a load to be engaged and then pulled through the slot in the body portion which serves to releasably engage the strap therein. U.S. Pat. No. 4,128,220 to McNeel discloses a flexible strap for attachment to electrical cables. The flexible plastic fastener comprises a ring handle defining a locking slot therein and having a flexible strap extending therefrom. The flexible strap is provided with a plurality of ridges across the top surface thereof which are engaged by a locking member in the handle slot when the remote end of the strap is pulled therethrough in order to be tightened around cables, hoses, wires, pneumatic lines, hydraulic lines, or the like.

Of further interest, U.S. Pat. Nos. 4,696,505 and 4,832,393 to Shadoan and Pitchford, respectively, disclose carrying devices which include a carrying handle having a strap fastened thereto for being wrapped around an article to be transported. The carrying devices taught in the aforementioned patents differ somewhat in construction, but both allow for the flexible strap to be looped around an article and then releasably engaged by the carrying handle. See also the following patents: U.S. Pat. Nos. 2,345,279; 3,009,220; 3,022,557; 3,054,585; 4,191,334; 4,272,047; 4,458,385; and 4,728,064.

DISCLOSURE OF INVENTION

In accordance with the present invention, applicant provides an adjustable clamp with handle designed specifically for consumer use at home, school or the workplace for engaging and holding a plurality of articles such as water hose, electrical cables, plumbing pipe, carpet rolls and newspapers. The adjustable clamp provides a unique locking mechanism adapted to better hold and more quickly release the articles being handled and comprises an elongate handle member with a first channel extending generally in the lengthwise direction of the handle member and a second channel adjacent one end of the handle member which substantially perpendicularly intersects the first channel. A removable, flexible strap is provided which defines an aperture at a first end thereof and a plurality of ridges along at least a portion of the length of the second end thereof wherein the second end is slidably inserted through the second channel of the handle member and bent back upon itself and slidably inserted through the first channel of the handle member and through the aperture in the first end of the flexible strap residing in the first channel so that the ridges thereof face the top of the handle member. The aperture in the first end of the flexible strap includes ridge engagement means opposing the ridges of the flexible strap of the second end extending therethrough. Lock means are provided for releasably locking the ridge engagement means of the second end of the flexible strap against at least one of the ridges of the first end of the flexible strap. In this fashion, the locking mechanism does not require that tension be applied to the strap by the load being held in order to engage the locking mechanism as do many of the flexible straps and clamps known in the field of the related art.

It is therefore the object of the present invention to provide an easy-to-use adjustable clamp for temporarily binding loose articles and holding them.

It is another object of the present invention to provide an adjustable clamp which provides for quick and reliable engagement of an article for storage or transportation to a desired location.

It is another object of the present invention to provide an adjustable clamp utilizing a novel locking mechanism which is not dependent on the weight of the articles engaged thereby to engage the locking mechanism.

It is yet another object of the present invention to provide an adjustable clamp which does not have to be tightly attached to the articles carried thereby in order to securely hold and/or carry them.

It is still another object of the present invention to provide an adjustable, reusable clamp for consumer applications at home, school and work which is unexpectedly simple to lock and unlock about articles held thereby.

Some of the objects of the invention having been stated, other object will become evident as the description proceeds, when taken in connection with the accompanying drawings.

DESCRIPTION OF THE DRAWINGS

FIG. 3 is a vertical cross-sectional view of the handle and a portion of the flexible strap carried thereby with the locking mechanism of the adjustable clamp in the mode;

FIG. 3A is an enlarged view of the intersecting flexible strap ends, shown in FIG. 3;

FIG. 4 shows the adjustable clamp of FIG. 3 with the locking in the unlocked mode; and FIG. 4A an enlarged view of the intersecting flexible strap ends shown in FIG. 4.

BEST MODE FOR CARRYING OUT THE INVENTION

Figure 1:
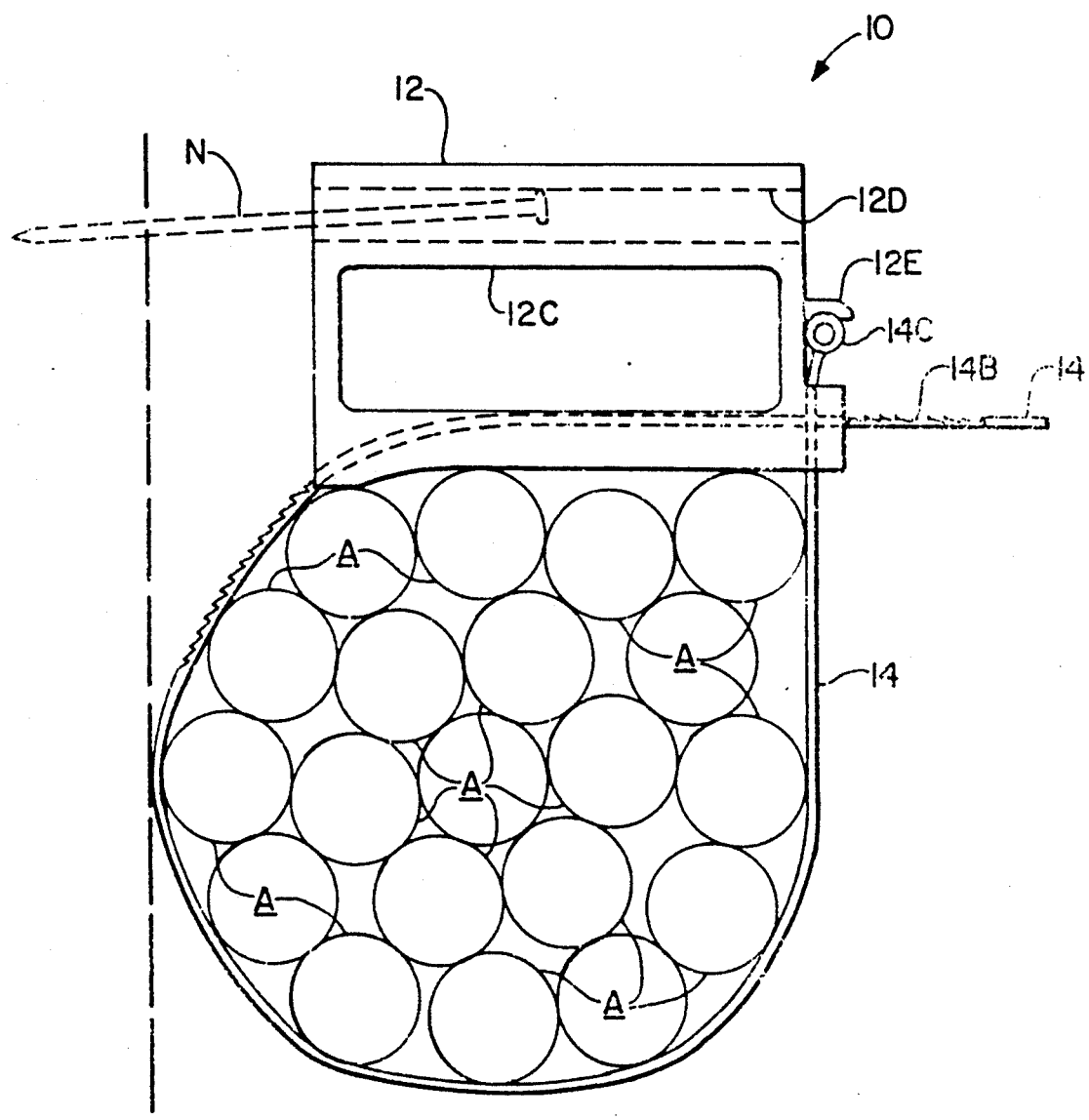
FIG. 1 is a side elevation view of the adjustable clamp of the invention with selected internal portions indicated by lines.
Figure 2:
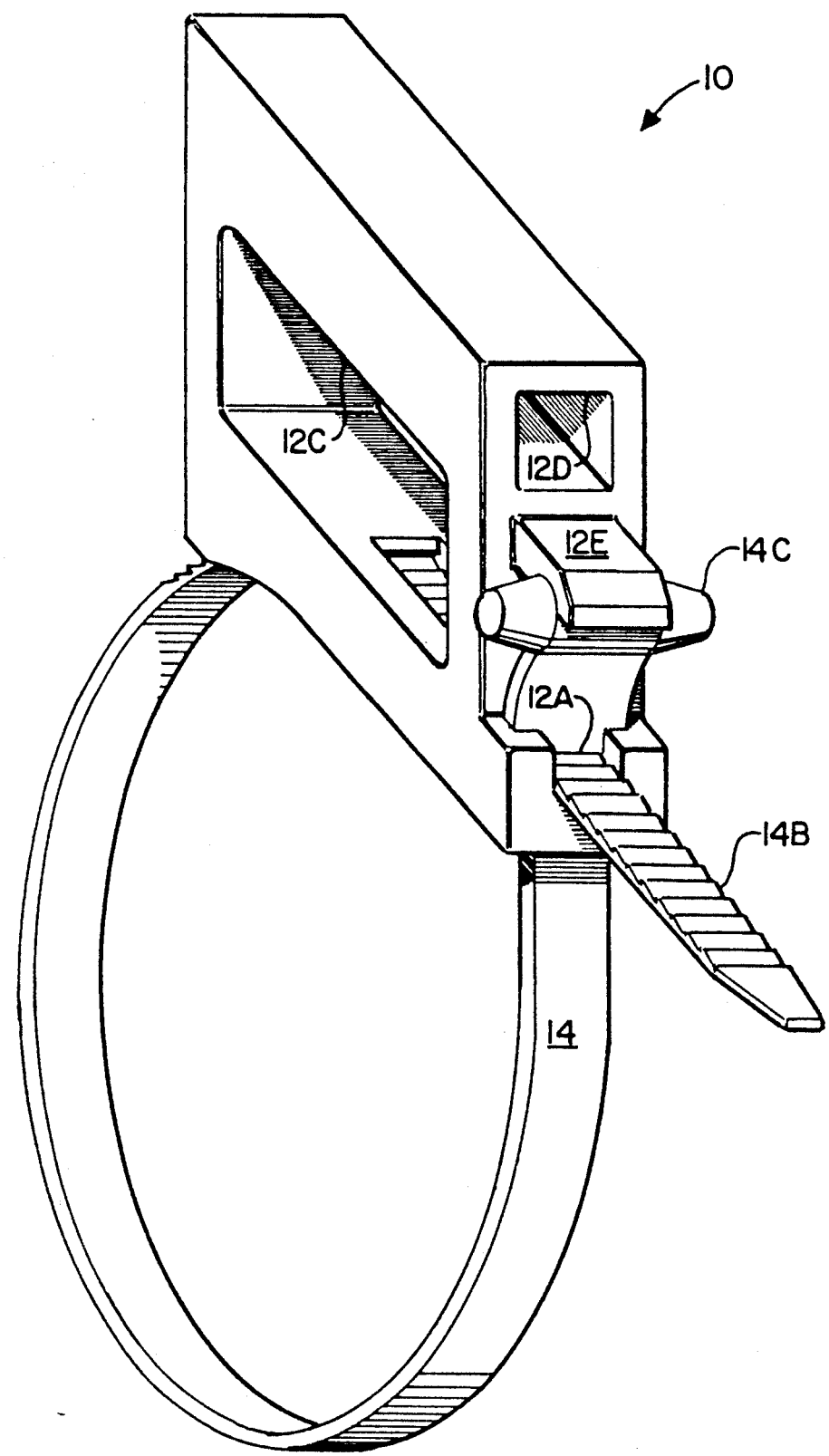
FIG. 2 is a perspective view of the adjustable clamp of the invention.

Referring now more specifically to the drawings, a preferred embodiment of an adjustable clamp according to the present invention is shown in FIGS. 1 and 2 and is generally designated by the numeral 10. Adjustable clamp 10 comprises handle 12 and flexible strap 14 which are most suitably formed from rigid plastic and flexible plastic, respectively, although it is contemplated that the device can be formed from any other suitable material which will enable it to serve its intended function. Handle 12 defines a first channel 12A therein (see FIGS. 3 and 4) which extends vertically downwardly through a portion of handle 12. A second channel 12B extends generally in the lengthwise direction of handle 12 and perpendicularly intersects first channel 12A as best seen with reference to FIGS. 2-4.

Handle 12 further comprises an enclosed first aperture 12C which provides for extending the hand therethrough for gripping handle 12 and a second aperture 12D which, as seen in FIG. 1, allows for hanging adjustable clamp 10 on a nail N or other suitable structure when the clamp has been used to engage and hold a plurality of articles A. Although adjustable clamp 10 is shown in FIG. 1 as being detachably secured to a nail on a wall or the like while holding a plurality of articles A, it should be appreciated that it is also contemplated that the clamp could be used to transport articles A from one location to another.

As best seen in FIGS. 2-4, first aperture 12C is open and communicates along a portion of the bottom thereof with second channel 12B so that a portion of the length of the channel L is open and accessible within first aperture 12C. This is intended to facilitate access to flexible strap 14 by the user in order to urge inward or outward movement thereof relative to handle 12 as may be desired prior to unlocking or locking the locking mechanism of adjustable clamp 10 in a fashion which will be explained in more detail hereinafter.

Referring again to flexible strap 14, it should be appreciated that flexible strap 14 defines an aperture 14A (see FIGS. 2-4), most suitably a four-sided generally square or rectangular aperture, at the first end thereof which is sized so as to accommodate passage of the second end of flexible strap 14 therethrough which defines a plurality of ridges 14B along at least a portion of the length of the upper surface thereof. Aperture 14A (see FIGS. 3 and 4) is suitably configured with a blade edge 14A' across the top surface thereof which when forced downwardly against ridges 14B of flexible strap 14 will lockably engage flexible strap 14 and prevent any slidable movement thereof within second channel 12B of handle 12 and relative to flexible strap 14.

The locking mechanism for effecting the releasable lock between the first and second ends of flexible strap 14 comprises an enlarged end portion or knob 14C at the first end of flexible strap 14 and a detente 12E which extends from one end of handle 12 and is positioned above but spaced-apart from first channel 12A therebeneath. Thus, in order to lock the first and second ends of flexible strap 14 together so as to securely hold articles A contained thereby, it is only necessary to laterally urge knob 14C inwardly toward handle 12 and into forcible engagement with detente 12E. When knob 14C is engaged by detente 12E, knob 14C is urged vertically downwardly so as to correspondingly urge the first end of flexible strap 14 slidably downwardly within first channel 12A and to in turn urge blade edge 14A' into engagement with ridges 14B provided on the second end of flexible strap 14 (see FIGS. 3A and 3B). This unique locking mechanism for adjustable clamp 10 does not rely solely on tensioning between the opposing ends of flexible strap 14 due to the weight of the load as do many previously known clamps. The locking mechanism provides a positive locking action which functions independently of the forces which may be applied to flexible strap 14 by the load of articles A held thereby.

In order to unlock the locking mechanism of adjustable clamp 10, one merely urges knob 14C outwardly from under detente 12E and, if necessary, pulls it slightly vertically upwardly in order to raise blade edge 14A' from locking engagement with ridges 14B (see FIGS. 3A and 3B). This frees the second end of flexible strap 14 to be slidably withdrawn a sufficient length from aperture 14A in the first end of flexible strap 14 so as to release articles A held by adjustable clamp 10. Obviously, the procedure is reversed in order to again use adjustable clamp 10 in order to engage and hold a plurality of articles A so as to either temporarily hang adjustable clamp 10 and articles A held thereby on a support nail N or the like or to carry articles A from one location to another in a convenient and easy fashion.

In use, flexible strap 14 is attached to handle 12 by inserting the first end thereof through first channel 12A of handle 12 and pulling flexible strap 12 therethrough until aperture 14A at the second end thereof is in registration with second channel 12B in handle 12. The free first end of flexible strap 14 is then inserted into the end of second channel 12B remote from the locking mechanism and pushed therethrough and through aperture 14A in the first end of flexible strap 14 now residing in the first channel of handle 12. The first end of flexible strap 14 is then urged outwardly from handle 12 and suitably tightened around an article or bundle of articles A so as to hold them.

Next, the two ends of flexible strap 14 are locked together by urging knob 14C against detente 12E which in turn forces the upper blade edge 14A' of aperture 14A into locking engagement with one or more ridges 14B of flexible strap 14. The resulting engagement between the two ends of the flexible strap is relatively rigid and serves to hold articles A without relying exclusively on the tension forces applied by articles A to flexible strap 14 for locking engagement. This provides the advantages of a superior locking action as well as the ability to hold or carry articles with adjustable clamp 10 without being required to fully tighten flexible strap 14 therearound. As noted hereinbefore, adjustable clamp 10 is contemplated as having a number of consumer applications at home, school and in the workplace for holding and/or carrying articles including water hose, electrical cords, tools, carpet rolls, plumbing pipe, electrical devices, fishing paraphernalia, and newspapers.

It will be understood that various details of the invention may be changed without departing from the scope of the invention. Furthermore, the foregoing description is for the purpose of illustration only, and not for the purpose of limitation—the invention being defined by the claims.

What is claimed is:

1. An adjustable clamp comprising:

an elongate handle member having a top and a bottom and a first and second end, said handle member defining a first channel therethrough extending generally in the lengthwise direction thereof and a second channel adjacent the first end thereof which substantially perpendicularly intersects the first channel;

a flexible strap defining an aperture at a first end thereof and a plurality of ridges along at least a portion of the length of the second end thereof, the second end being slidably inserted through the second channel of said handle member and bent back upon itself and slidably inserted through the first channel of said handle member with the ridges thereof facing the top of said handle member, and through the aperture in the first end of said flexible strap positioned in the first channel, wherein the aperture includes ridge engagement means opposing the ridges of said flexible strap extending therethrough; and lock means for releasably urging the ridge engagement means of the aperture of said flexible strap downwardly against at least one of the ridges of the first end of said flexible strap.

2. An adjustable clamp according to claim 1 wherein said elongate handle member includes a first lengthwise extending aperture therein for gripping said adjustable clamp and a second lengthwise extending aperture therein defining at least one open end for hanging said adjustable clamp on a nail or the like.

3. An adjustable clamp according to claim 1 wherein the aperture of said flexible strap is four-sided and the ridge engagement means comprises a blade member extending across the top thereof.

4. An adjustable clamp according to claim 1 wherein said lock means comprises a knob mounted on the first end of said flexible strap and a detente mounted on the first end of said handle member proximate to but spaced-apart from the second channel so as to snubbingly engage the knob when the knob is urged thereagainst and to force the ridge engagement means downwardly against one or more of the ridges thereof.

5. An adjustable clamp according to claim 1 wherein said flexible strap may be slidably detached from said handle member.

6. An adjustable clamp according to claim 1 wherein said handle member comprises rigid plastic and said flexible strap comprises flexible plastic.

7. An adjustable clamp comprising:

an elongate handle member having a top and a bottom and a first and second end, said handle member defining a first channel therethrough extending generally in the lengthwise direction thereof and a second channel adjacent the first end thereof which substantially perpendicularly intersects the first channel;

a detachable flexible strap defining an aperture at a first end thereof and a plurality of ridges along at least a portion of the length of the second end thereof, the second end being slidably inserted through the second channel of said handle member and bent back upon itself and slidably inserted through the first channel of said handle member with the ridges thereof facing the top of said handle member, and through the aperture in the first end of said flexible strap positioned in the first channel, wherein the aperture includes ridge engagement means opposing the ridges of said flexible strap extending therethrough; and lock means for releasably urging the ridge engagement means of the aperture of said flexible strap downwardly against at least one of the ridges of the first end of said flexible strap, said lock means comprising a knob mounted on the first end of said flexible strap and a detente mounted on the first end of said handle member proximate to but spaced-apart from the second channel so as to snubbingly engage the knob when the knob is urged thereagainst and to force the ridge engagement means downwardly against one or more of the ridges thereof.

8. An adjustable clamp according to claim 7 wherein said elongate handle member includes a first lengthwise extending aperture therein for gripping said adjustable clamp and a second lengthwise extending aperture therein defining at least one open end for hanging said adjustable clamp on a nail or the like.

9. An adjustable clamp according to claim 7 wherein the aperture of said flexible strap is four-sided and the ridge engagement means comprises a blade member extending across the top thereof.

10. An adjustable clamp according to claim 7 wherein said flexible strap may be slidably detached from said handle member.

11. An adjustable clamp comprising:

an elongate handle member having a top and a bottom and a first and second end, said handle member defining a first channel therethrough extending generally in the lengthwise direction thereof and a second channel adjacent the first end thereof which substantially perpendicularly intersects the first channel;

a slidably detachable flexible strap defining an aperture at a first end thereof and a plurality of ridges along at least a portion of the length of the second end thereof, the second end being slidably inserted through the second channel of said handle member and bent back upon itself and slidably inserted through the first channel of said handle member with the ridges thereof facing the top of said handle member, and through the aperture in the first end of said flexible strap positioned in the first channel, wherein the aperture includes a blade member opposing the ridges of said flexible strap extending therethrough; and lock means for releasably urging the blade member of the aperture of said flexible strap downwardly against at least one of the ridges of the first end of said flexible strap, said lock means comprising an annular cross section knob mounted on the first end of said flexible strap and a detente mounted on the first end of said handle member proximate to but spaced-apart from the second channel so as to snubbingly engage the knob when the knob is urged thereagainst and to force the blade member downwardly against one or more of the ridges thereof.

12. An adjustable clamp according to claim 11 wherein said elongate handle member includes a first lengthwise extending aperture therein for gripping said adjustable clamp and a second lengthwise extending aperture therein defining at least one open end for hanging said adjustable clamp on a nail or the like.

* * * * *